United States Patent
Higuchi et al.

(10) Patent No.: US 6,725,068 B2
(45) Date of Patent: Apr. 20, 2004

(54) DIGITAL WIRELESS TELEPHONE SYSTEM

(75) Inventors: Kazuhisa Higuchi, Tokyo (JP); Hideki Kamataki, Chofu (JP)

(73) Assignee: Tokyo Digital Phone Co., Ltd., Tokyo (JP)

(*) Notice: Subject to any disclaimer, the term of this patent is extended or adjusted under 35 U.S.C. 154(b) by 201 days.

(21) Appl. No.: 09/975,916

(22) Filed: Oct. 12, 2001

(65) Prior Publication Data

US 2002/0016190 A1 Feb. 7, 2002

Related U.S. Application Data

(63) Continuation-in-part of application No. 09/116,503, filed on Jul. 16, 1998.

(30) Foreign Application Priority Data

Aug. 5, 1997 (JP) .............................. 9-222079
Nov. 28, 1997 (JP) .............................. 9-341879

(51) Int. Cl.[7] .................................. H04B 1/38
(52) U.S. Cl. .................. 455/574; 455/13.4; 455/127.1; 455/458
(58) Field of Search .............................. 455/572, 573, 455/574, 414.1, 458, 13.4, 15, 67.11, 67.13, 95, 575, 115.1, 127.1, 226.1, 522

(56) References Cited

U.S. PATENT DOCUMENTS

| | | |
|---|---|---|
| 4,328,543 A | 5/1982 | Brickman et al. |
| 5,128,938 A | 7/1992 | Borras |
| 5,404,355 A * | 4/1995 | Raith .......................... 455/343 |
| 5,603,081 A | 2/1997 | Raith et al. |
| 5,604,744 A | 2/1997 | Andersson et al. |
| 5,627,882 A | 5/1997 | Chien et al. |
| 5,669,064 A | 9/1997 | Iseyama |
| 5,870,685 A * | 2/1999 | Flynn .......................... 455/573 |
| 5,889,770 A | 3/1999 | Jokiaho et al. |
| 5,930,706 A * | 7/1999 | Raith .......................... 455/422 |
| 5,940,760 A | 8/1999 | Uistola |
| 6,009,122 A | 12/1999 | Chow |
| 6,032,050 A | 2/2000 | Hasegawa |

FOREIGN PATENT DOCUMENTS

| | | |
|---|---|---|
| EP | 0629095 A2 | 12/1994 |
| EP | 0650306 A1 | 4/1995 |
| EP | 0762788 A2 | 3/1997 |
| EP | 0796025 A2 | 9/1997 |
| GB | 2280086 A | 1/1995 |
| JP | 63-111734 | 5/1988 |
| JP | 02-222331 | 9/1990 |
| JP | 04-302345 | 10/1992 |
| JP | 05-075528 | 3/1993 |
| JP | 05-260549 | 10/1993 |
| JP | 7-131404 | 5/1995 |
| JP | 7-326998 | 12/1995 |
| JP | 08-125757 | 5/1996 |
| JP | 08-172671 | 7/1996 |
| WO | WO 95/12931 | 5/1995 |
| WO | WO 95/12934 | 5/1995 |

* cited by examiner

*Primary Examiner*—Edward F. Urban
*Assistant Examiner*—Thuan T. Nguyen
(74) *Attorney, Agent, or Firm*—Akin Gump Strauss Hauer & Feld LLP

(57) ABSTRACT

A wireless telephone system comprises a mobile station having its reception portion turned on in timed relationship with paging channels contained in a sending signal having been issued from a telephone exchange to the mobile station through a base station, and has the reception portion de-energized in the remaining period of time, so that the intermittent standby reception operation is performed. The exchange sends a paging message in both an intermittent superframe reception group and a paging channel group, for which groups the mobile station is waiting. The unit receives broadcast information, specifies the intermittent superframe reception group on the basis of the contents of intermittent standby information contained in the broadcast information, and performs its intermittent standby reception operation in the reception group having been thus specified.

13 Claims, 12 Drawing Sheets

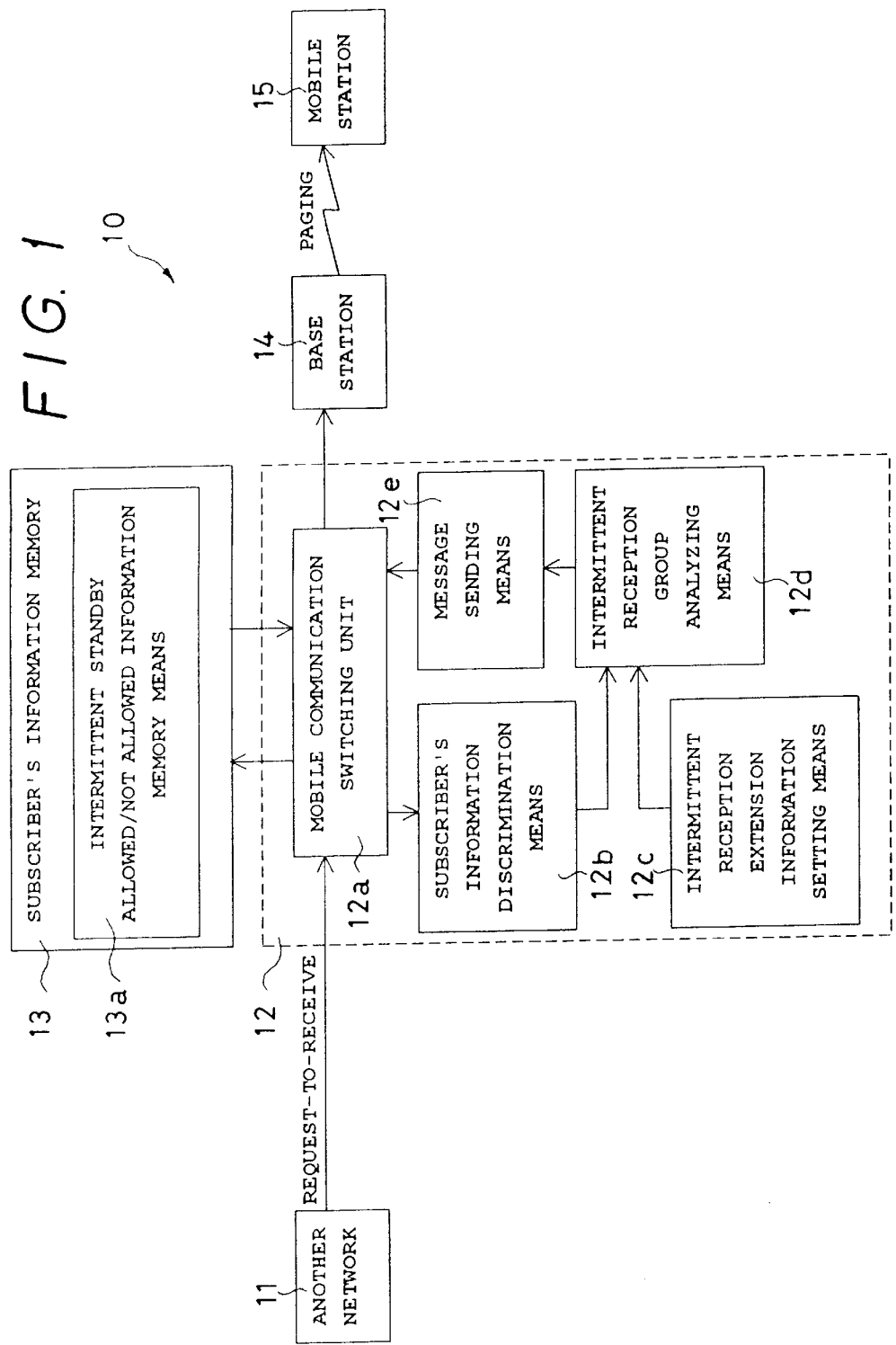

FIG. 2

BROADCAST INFORMATION

| INFORMATION ELEMENTS | INFORMATION LENGTH |
|---|---|
| MESSAGE TYPE | 1 |
| NETWORK NUMBER | 2 |
| RESTRICTION INFORMATION | 3 |
| CONTROL CHANNEL STRUCTURE INFORMATION | 6~33 |
| MOBILE STATION TRANSMISSION-POWER ASSIGNMENT | 1 |
| STANDBY ALLOWED LEVEL | 1 |
| DETERIORATION LEVEL | 1 |
| ⋮ | |
| LOCATION REGISTRATION TIMER | 1 |
| INFORMATION LENGTH OF EXETENSION INFORMATION (K) | 1 |
| INTERMITTENT STANDBY INFORMATION | 1 |

FIG. 3

INFORMATION ELEMENTS OF INTERMITTENT STANDBY INFORMATION

| | BIT | | | | | | | |
|---|---|---|---|---|---|---|---|---|
| | 8 | 7 | 6 | 5 | 4 | 3 | 2 | 1 |
| OCTET 1 | INTERMITTENT STANDBY SUPERFRAME INTERVAL (Pi) | | | | INTERMITTENT STANDBY SUPERFRAME COUNTER (Cs) | | | |

INTERMITTENT STANDBY SUPERFRAME INTERVAL (Pi) : BINARY, (0~15)
INTERMITTENT STANDBY SUPERFRAME COUNTER (Cs) : BINARY, (0~Pi-1)

FIG. 4

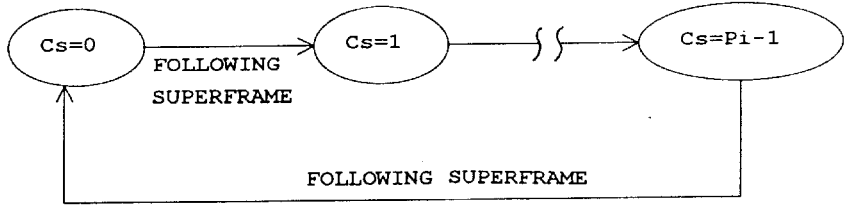

INFORMATION ELEMENTS OF INTERMITTENT STANDBY SUPERFRAME COUNTER

INFORMATION ELEMENTS OF INTERMITTENT STANDBY SUPERFRAME COUNTER (Cs) : BINARY, (0~Pi-1)

INFORMATION ELEMENTS OF INTERMITTENT STANDBY SUPERFRAME INTERVAL

INFORMATION ELEMENTS OF INTERMITTENT STANDBY SUPERFRAME INTERVAL (Pi) : BINARY, (0~15)

DIGITAL WIRELESS TELEPHONE SYSTEM

CROSS-REFERENCE TO RELATED APPLICATIONS

This application claims the benefit of U.S. patent application Ser. No. 09/116,503, filed Jul. 16, 1998, entitled "Digital Wireless Telephone System" which is hereby incorporated by reference in its entirety.

BACKGROUND OF THE INVENTION

1. Field of the Invention

The present invention relates to a digital wireless telephone system, and more particularly to a digital wireless telephone system, in which a mobile station is improved in efficiency of the intermittent reception operation in its standby mode reducing power consumption.

2. Description of the Related Art

In the digital wireless telephone system, since the mobile station uses a battery as its own power source, it is very important for the mobile station to reduce its power consumption. In this connection, various types of techniques have been developed to reduce the power consumption of the mobile station. Of these techniques, a so-called battery saving technique has been widely used, in which technique the mobile station has its reception portion intermittently operated in its standby mode to reduce its power consumption. FIG. 8($a$) shows a conventional intermittent reception operation of the mobile station in its standby mode. Transmitted at predetermined time intervals in a sending signal used in the conventional intermittent reception operation of the mobile station are time slots each containing paging information of the mobile station. The reception portion of the mobile station has its own power source turned on in timed relationship with paging channels (i.e., P); and turned off in the remaining period of time. For example, in the Digital Mobile-Phone System Standards (i.e., RCR STD-27) prepared by the Denpa Sangyo kai (i.e., ARIB), there is stipulated the intermittent reception operation of the mobile station for saving its battery power in the standby mode in a radio zone. An interval used in such intermittent reception operation stipulated in the above Standards is equal to one superframe interval (i.e., 720 milliseconds) at maximum.

However, in the conventional intermittent reception operation with such one superframe interval at maximum, it is not possible to increase a continuous standby period of time, and, therefore often not possible to increase the efficiency of the intermittent reception operation. Further, the conventional intermittent reception operation with such one superframe interval at maximum is disadvantageous in that it can not set arbitrarily the continuous standby period of time.

BRIEF SUMMARY OF THE INVENTION

Under such circumstances, the present invention was made. Consequently, it is an object of the present invention to provide a digital wireless telephone system, in which the interval in an intermittent reception operation of a mobile station is increased, so that a continuous standby period of time of the mobile station is increased to reduce power consumption of the mobile station.

According to a first aspect of the present invention, the above object of the present invention is accomplished by providing:

In a digital wireless telephone system comprising a mobile station provided with a reception portion, which portion is timed in its turning-on-power operation to a paging channel contained in a sending signal issued from a telephone exchange to the mobile station through a base station, and is held in its de-energized state in the remaining period of time, the improvement wherein:

when an intermittent standby operation is available, the telephone exchange sends out a paging message in an intermittent superframe reception group and in a paging channel group, for which groups the mobile station is waiting; and the mobile station receives broadcast information, specifies an intermittent reception group on the basis of the contents of intermittent standby information contained in the broadcast information, and performs its intermittent standby reception operation in the reception group having been thus specified.

In the digital wireless telephone system having the above construction, the mobile station performs the intermittent standby reception operation based on the intermittent standby information contained in the broadcast information having been received by the mobile station, so that the interval in such intermittent reception operation is increased, whereby the continuous standby period of time of the mobile station is also increased so as to reduce the power consumption of the mobile station.

According to a second aspect of the present invention, the above object of the present invention is accomplished by providing:

The digital wireless telephone system as set forth in the first aspect of the present invention, wherein the telephone exchange comprises:

an intermittent reception extension information setting means for setting the contents of intermittent standby information in an extension information element contained in the broadcast information;

a subscriber's information discriminating means for discriminating subscriber's information;

an intermittent reception group analyzing means for analyzing the intermittent reception group of the mobile station, on the basis of a discrimination result obtained from the subscriber's information discriminating means and of the intermittent standby information having been set by the intermittent reception extension information setting means; and a message sending means for sending out the paging message in an intermittent reception group and the paging channel group, for which groups the mobile station is waiting.

The digital wireless telephone system having the above construction is preferable in that the mobile station performs the intermittent standby reception operation based on the intermittent standby information contained in the broadcast information having been received by the mobile station to further increase the interval in such intermittent reception operation.

According to a third aspect of the present invention, the above object of the present invention is accomplished by providing:

The digital wireless telephone system as set forth in the first aspect of the present invention, wherein defined as the contents of intermittent standby information in the broadcast information are:

an extension information element length; and an intermittent standby information element comprising an intermittent standby superframe interval and an intermittent standby superframe counter.

The digital wireless telephone system having the above construction is preferable in that the system is capable of arbitrarily setting the interval in the intermittent standby operation of the mobile station, and also capable of performing both synchronization and compensation of such interval.

According to a fourth aspect of the present invention, the above object of the present invention is accomplished by providing:

In a digital wireless telephone system comprising a mobile station provided with a reception portion, which portion is timed in its turning-on-power operation to a paging channel contained in a sending signal issued from a telephone exchange to the mobile station through a base station, and is held in its de-energized state in the remaining period of time, the improvement wherein:

the telephone exchange retrieves both of location information and subscriber's information from a subscriber's information memory, and sends out a paging message in both an intermittent superframe reception group and a paging channel group, for which groups the mobile station is waiting; and the mobile station receives broadcast information, specifies an intermittent reception group on the basis of an intermittent standby superframe interval having been set in its own unit by means of an intermittent standby superframe counter, and performs its intermittent standby reception operation in the reception group having been thus specified.

In the digital wireless telephone system having the above construction, the mobile station uses the intermittent standby superframe counter contained in the broadcast information, specifies the intermittent reception group on the basis of the intermittent standby superframe interval having been set in its own unit, and performs the intermittent standby reception operation in the reception group thus specified, which enables the system to increase the interval in the intermittent reception operation of the mobile station without providing in its subscriber's information memory any information indicating whether or not the mobile station is adapted to perform a high-efficiency operation, whereby the continuous standby period of time of the mobile station is increased, and the mobile station has its power consumption decreased.

According to a fifth aspect of the present invention, the above object of the present invention is accomplished by providing:

The digital wireless telephone system as set forth in the fourth aspect of the present invention, wherein:

the telephone exchange comprises:

a Cs information setting means for setting an intermittent standby superframe counter information element in an extension information element contained in the broadcast information;

an intermittent reception group analyzing means for analyzing the intermittent reception group of the mobile station, on the basis of the location information and the subscriber's information both retrieved from a subscriber's information memory; and a message sending means for sending out the paging message in the intermittent superframe reception group and the paging channel group, for which groups the mobile station is waiting;

while the mobile station comprises:

a Pi memory means for recording the intermittent standby superframe interval.

The digital wireless telephone system having the above construction is preferable in that the mobile station receives the broadcast information, uses the intermittent standby superframe counter contained in the broadcast information, and performs the intermittent standby reception operation at the intermittent standby superframe intervals of its own unit.

According to a sixth aspect of the present invention, the above object of the present invention is accomplished by providing:

In a digital wireless telephone system comprising a mobile station provided with a reception portion, which portion is timed in its turning-on-power operation to a paging channel contained in a sending signal issued from a telephone exchange to the mobile station through a base station, and is held in its de-energized state in the remaining period of time, the improvement wherein:

the telephone exchange retrieves both of location information and subscriber's information from a subscriber's information memory, and continuously sends out an inter-superframe paging message in a paging channel group, for which groups the mobile station is waiting, the number of the inter-superframe paging messages being the same value as that of intermittent standby superframe intervals; and the mobile station receives broadcast information, and performs its intermittent standby reception operation, on the basis of both the broadcast information and the contents of intermittent standby information which contains the intermittent standby superframe interval having been set in its own unit.

In the digital wireless telephone system having the above construction, the mobile station is capable of performing, without involving any delay time, the high-efficiency intermittent reception operation in the paging messages thus continuously transmitted, on the basis of both the broadcast information and the intermittent standby information having been set in its own unit.

According to a seventh aspect of the present invention, the above object of the present invention is accomplished by providing:

The digital wireless telephone system as set forth in the sixth aspect of the present invention, wherein:

the telephone exchange comprises:

a PCH group analyzing means for analyzing the paging channel group, for which group the mobile station is waiting, on the basis of the location information and the subscriber's information both retrieved from a subscriber's information memory; and a message continuously sending out means for continuously sending out an inter-superframe paging message in a paging channel group, for which group the mobile station is waiting, the number of the inter-superframe paging messages being the same value as that of intermittent standby superframe intervals;

while the mobile station comprises:

an intermittent reception information memory means for recording the contents of intermittent standby information containing the intermittent standby superframe interval.

The digital wireless telephone system having the above construction is preferable in that the mobile station receives the broadcast information, uses the intermittent standby information having been set in its own unit, and performs the intermittent standby reception operation so that the interval in such intermittent reception operation is further increased.

According to an eighth aspect of the present invention, the above object of the present invention is accomplished by providing:

In a digital wireless telephone system comprising a mobile station provided with a reception portion, which portion is timed in its turning-on-power operation to a paging channel contained in a sending signal issued from a telephone exchange to the mobile station through a base station, and is held in its de-energized state in the remaining period of time, the improvement wherein:

the telephone exchange retrieves both of location information and subscriber's information from a subscriber's information memory, and continuously sends out an inter-superframe paging message in a paging channel group, for which groups the mobile station is waiting, the number of the inter-superframe paging messages being the same value as that of intermittent standby superframe intervals; and the mobile station receives broadcast information, and performs its intermittent standby reception operation, on the basis of the intermittent standby superframe interval contained in the broadcast information.

In the digital wireless telephone system having the above construction, the mobile station uses the intermittent standby superframe interval contained in the broadcast information, and performs the intermittent standby operation in the paging messages having been continuously transmitted, which enables the mobile station to performs the high-efficiency intermittent reception operation without involving any delay time.

According to a ninth aspect of the present invention, the above object of the present invention is accomplished by providing:

The digital wireless telephone system as set forth in the eighth aspect of the present invention, wherein:

the telephone exchange comprises:

a Pi information setting means for setting the intermittent standby superframe interval information element in an extension information element contained in the broadcast information;

a PCH group analyzing means for analyzing the paging channel group, for which group the mobile station is waiting, on the basis of the location information and the subscriber's information both retrieved from a subscriber's information memory; and a message continuously sending out means for continuously sending out an inter-superframe paging message in a paging channel group, for which group the mobile station is waiting, the number of the inter-superframe paging messages being the same value as that of the intermittent standby superframe intervals.

The digital wireless telephone system having the above construction is preferable in that the mobile station receives the intermittent standby superframe interval contained in the broadcast information, and performs the intermittent standby reception operation so that the interval in such intermittent reception operation is further increased.

According to a tenth aspect of the present invention, the above object of the present invention is accomplished by providing:

The digital wireless telephone system as set forth in the first aspect of the present invention, wherein:

in intermittent reception state, the mobile station measures a perch channel in a peripheral zone after completion of reception of the paging channel in timing, the number of the peripheral zones to be measured being the same value as that of the intermittent standby superframe intervals.

The digital wireless telephone system having the above construction is preferable in that the perch channel in the peripheral zones is measured in timed relationship with the intermittent reception operation.

According to an eleventh aspect of the present invention, the above object of the present invention is accomplished by providing:

The digital wireless telephone system as set forth in the first aspect of the present invention, wherein:

in intermittent reception state, the mobile station measures a perch channel in a peripheral zone each time a superframe appears.

The digital wireless telephone system having the above construction is preferable in that the perch channel in the peripheral zones is measured in timed relationship with the intermittent reception operation.

According to a twelfth aspect of the present invention, the above object of the present invention is accomplished by providing:

The digital wireless telephone system as set forth in first aspect of the present invention, wherein, the mobile station measures a bit error rate and a level of reception, and performs its high efficiency intermittent reception when both of said bit error rate and said level of reception have reached a prescribed value for a prescribed period of time. Each mobile station measures the bit error rate (hereinafter called BER) and the level of reception each time a superframe appears. The mobile station also has a counter that counts if both of the BER and the reception level values have reached prescribed values and lasts until the next superframe appears. Alternatively, the mobile station comprises two counters, a first counter which advances when the BER reaches a prescribed value and lasts for one superframe (i.e. until the next superframe appears), and a second counter which advances when the level of reception reaches a prescribed value and also lasts for one superframe.

According to a thirteenth aspect of the present invention, the above object of the present invention is accomplished by providing:

The digital wireless telephone system as set forth in the first aspect of the present invention, wherein, in high efficiency intermittent reception, the mobile station measures a bit error rate and a level of reception, and stops its high efficiency intermittent reception and performs ordinary intermittent reception when either said bit error rate or said level of reception fail to reach a prescribed value for a prescribed period of time.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 is a schematic block diagram of the digital wireless telephone system of a first embodiment of the present invention;

FIG. 2 is a schematic block diagram of the contents of broadcast information used in the first embodiment of the present invention shown in FIG. 1;

FIG. 3 is a schematic block diagram of the information element of the intermittent standby information used in the first embodiment of the present invention shown in FIG. 1;

FIG. 4 is a schematic block diagram illustrating the operation of the superframe counter of the intermittent standby information used in the first embodiment of the present invention shown in FIG. 1;

FIGS. 9(a) and 9(b) are timing charts each illustrating the intermittent standby operation based on measurement of the peripheral zone when the mobile station performs its high-efficiency intermittent reception operation in the first embodiment of the present invention shown in FIG. 1, wherein FIG. 9(a) shows the perch channels measured at two frequencies (i.e., f1 and f2) in the peripheral zone immediately after receipt of information of the paging channel (i.e., PCH), and FIG. 9(b) shows the perch channels measured at a first and a second frequency (i.e., f1 and f2) in a first and a second superframe, respectively;

DETAILED DESCRIPTION OF THE INVENTION

Figure 5:
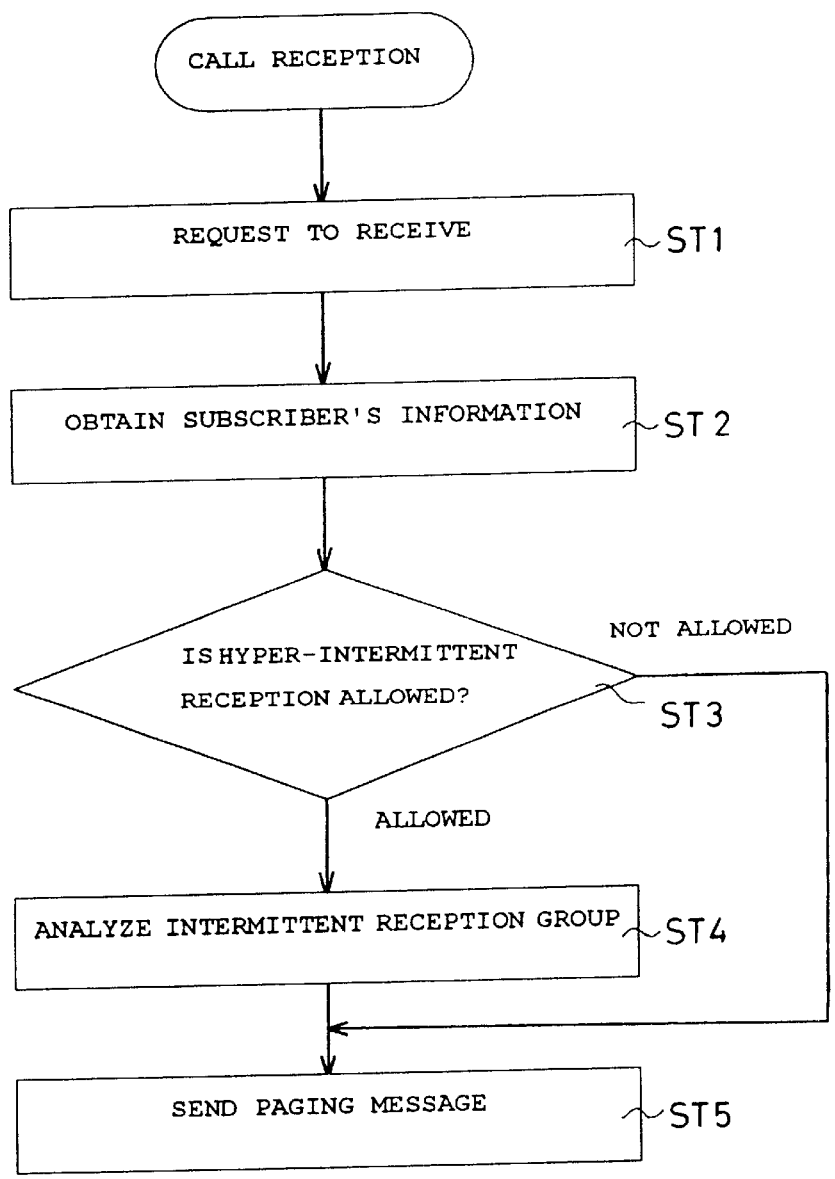
FIG. 5 is a flowchart illustrating an operation performed after the request-to-receive is made to the mobile station in the first embodiment of the present invention shown in FIG. 1.

Herein below, the present invention will be described in detail with reference to the accompanying drawings, in which FIGS. 1 to 4 shows a first embodiment of a digital wireless telephone system 10 of the present invention. More particularly, in the drawings: FIG. 1 is a schematic block diagram of the digital wireless telephone system 10 of the first embodiment; FIG. 2 is a schematic block diagram of the contents of broadcast information used in the first embodiment; FIG. 3 is a schematic block diagram of the information element of the intermittent standby information used in the first embodiment; and, FIG. 4 is a schematic block diagram illustrating the operation of the superframe counter of the intermittent standby information used in the first embodiment.

In FIG. 1 showing the digital wireless telephone system 10 of the present invention: the reference numeral 11 denotes another network; 12 a telephone exchange; 13 a subscriber's information memory; 14 a base station; and 15 a mobile station. The telephone exchange 12 comprises: a mobile communication switching unit 12a for radio-controlling the base station 14 having a radio zone in which the mobile station 15 stays, the mobile communication switching unit 12a also providing a telecommunication service to the mobile station 15 through the base station 14; a subscriber's information discrimination means 12b for judging whether or not the intermittent standby operation of the first embodiment of the present invention is available, on the basis of information retrieved from a subscriber's information memory 13; an intermittent reception extension information setting means 12c for setting intermittent standby information contained in information (i.e., BCCH) which should be broadcast to all the mobile stations 15 staying in a cell or radio zone; an intermittent reception group analyzing means 12d for analyzing an intermittent reception group of the mobile stations 15 having received such information (i.e., BCCH); and, a message sending means 12e for sending paging information through the mobile communication switching unit 12a.

The subscriber's information memory 13 is a memory, which functions as a data base in the network, records both the subscriber's information and location registration information in order to provide a service to the mobile station 15, and is provided with an intermittent standby allowed/not allowed information memory means 13a for recording availability of a high-efficiency intermittent standby operation.

In general, a control signal used in telecommunication between the network and the mobile station 15 is of a one-way channel or of a two-way channel. Such control signal is constructed of: a broadcast channel (i.e., BCCH), which is a one-way channel for broadcasting the control information to the mobile stations 15 in order to transfer information as to an information channel structure necessary for location registration and also information as to the system 10; a paging channel (i.e., PCH), which is a one-way channel for broadcasting the same information to the mobile stations 15 in a paging area; and, a separate cell channel (i.e., SCCH) for transferring both the information necessary for connection control and the control information other than the paging information.

As shown in FIG. 2, the contents of the broadcast information message which is broadcast from the network to the mobile station 15. Such contents comprise a plurality of information elements, for example such as: message type; network number; restriction information; control channel structure information; and, like information elements, each of which has a predetermined information length in octet.

In the first embodiment of the present invention shown in FIG. 1, the intermittent standby information is previously defined in the extension information element contained in the broadcast information by the intermittent reception extension information setting means 12c. In other words, as shown in FIG. 3, in the first embodiment of the present invention: the information element length (i.e., K) of the extension information contained in the broadcast information is defined to be K=1; the intermittent standby information is defined by one information length, i.e., 1 octet; the 5th to the 8th bit contained in such 1 octet are used as an intermittent standby superframe interval (i.e., Pi) for determining an interval in the intermittent standby operation, while the 1st to the 4th bit contained in such 1 octet are used as an intermittent standby superframe counter (i.e., Cs) for counting the number of the superframes.

This intermittent standby superframe interval (i.e., Pi) specifies the superframe interval with which the mobile station 15 performs its intermittent reception operation (hereinafter referred to as the high-efficiency intermittent reception operation) in the first embodiment of the present invention. The intermittent standby superframe interval (i.e., Pi) is set at any one of values 1 to 15 in binary.

On the other hand, the intermittent standby superframe counter (i.e., Cs) is set for achieving synchronization and compensation of the superframe interval when the mobile station 15 performs the high-efficiency intermittent reception operation. Further, as shown in FIG. 4, a value of this intermittent standby superframe counter (i.e., Cs value) increases one by one from zero to a value of (Pi−1) each time the number of the superframes increases. When the value of this intermittent standby superframe counter (i.e., Cs value) reaches the value of (Pi−1), a value of a subsequent intermittent standby superframe counter (i.e., Cs value) is reset to zero. Incidentally, since the values of the intermittent standby superframe counter (i.e., Cs) differ in different superframes as described above, the contents of the broadcast information differ in different superframes. In this case, however, any operation for varying the broadcast information, which instructs the mobile station 15 to receive the broadcast information so as to ensure that the mobile station 15 receives such information without fail, is not performed.

Now, the intermittent reception operation of the first embodiment of the present invention will be described with reference to the drawings, in which FIG. 5 is a flowchart illustrating an operation performed after the request-to-receive is made to the mobile station 15 in the first embodiment of the present invention.

As shown in FIG. 5, in a step ST1, a request-to-receive is made from another network 11 to the mobile station 15. The step ST1 is followed by a subsequent step ST2, in which the mobile communication switching unit 12a retrieves location information and subscriber's information from the subscriber's information memory 13, and concurrently retrieves information (i.e., flag indicating availability of the intermittent standby operation) from the intermittent standby allowed/not allowed information memory means 13a, which flag indicates whether or not the high-efficiency intermittent reception operation of the first embodiment of the present invention is available.

Then, the step ST2 is followed by a subsequent step ST3, in which the availability of the high-efficiency intermittent reception operation is judged by the subscriber's information discrimination means 12b on the basis of the information retrieved from the subscriber's information memory 13.

In the step ST3, when it is judged that the high-efficiency intermittent reception operation is available, the step ST3 is followed by a subsequent step ST4, in which, on the basis of the intermittent standby information previously set by the intermittent reception extension information setting means 12c and also based on the mobile station's number contained in the subscriber's information and like information, the intermittent reception group analyzing means 12d analyzes both the intermittent superframe reception group (i.e., Is) and the paging channel (i.e., PCH) of the control channel.

After completion of such analysis, the step ST4 is followed by a subsequent step ST5, in which: in both the intermittent superframe reception group (i.e., Is) and the PCH group (i.e., Ip) of the control channel, the message sending means 12e sends out a paging message to the mobile station 15 through the mobile communication switching unit 12a and the base station 14.

On the other hand, in the step ST3, when the subscriber's information discrimination means 12b judges, on the basis of the information retrieved from the subscriber's information memory 13, that the high-efficiency intermittent reception operation is not available, the step ST3 goes to a step ST5. In the step ST5, the base station 14 sends out the paging message to the mobile station 15 which is not capable of performing the high-efficiency intermittent reception operation. In this case, within a cell, the control channel is often constructed of a plurality of radio channels.

Consequently, the paging channels (i.e., PCH) are grouped into the PCH group (i.e., Ip) for the intermittent reception operation of the mobile station 15. As for analysis of the intermittent superframe reception group (i.e., Is), for example, when "n" represents in decimal notation a value of the lower 2 octets of the mobile station's number, the intermittent superframe reception group (i.e., Is) is determined by the following calculation: namely $$Is = n \bmod Pi$$

The above calculation represents the remainder obtained by dividing the n by the Pi.

Figure 6:
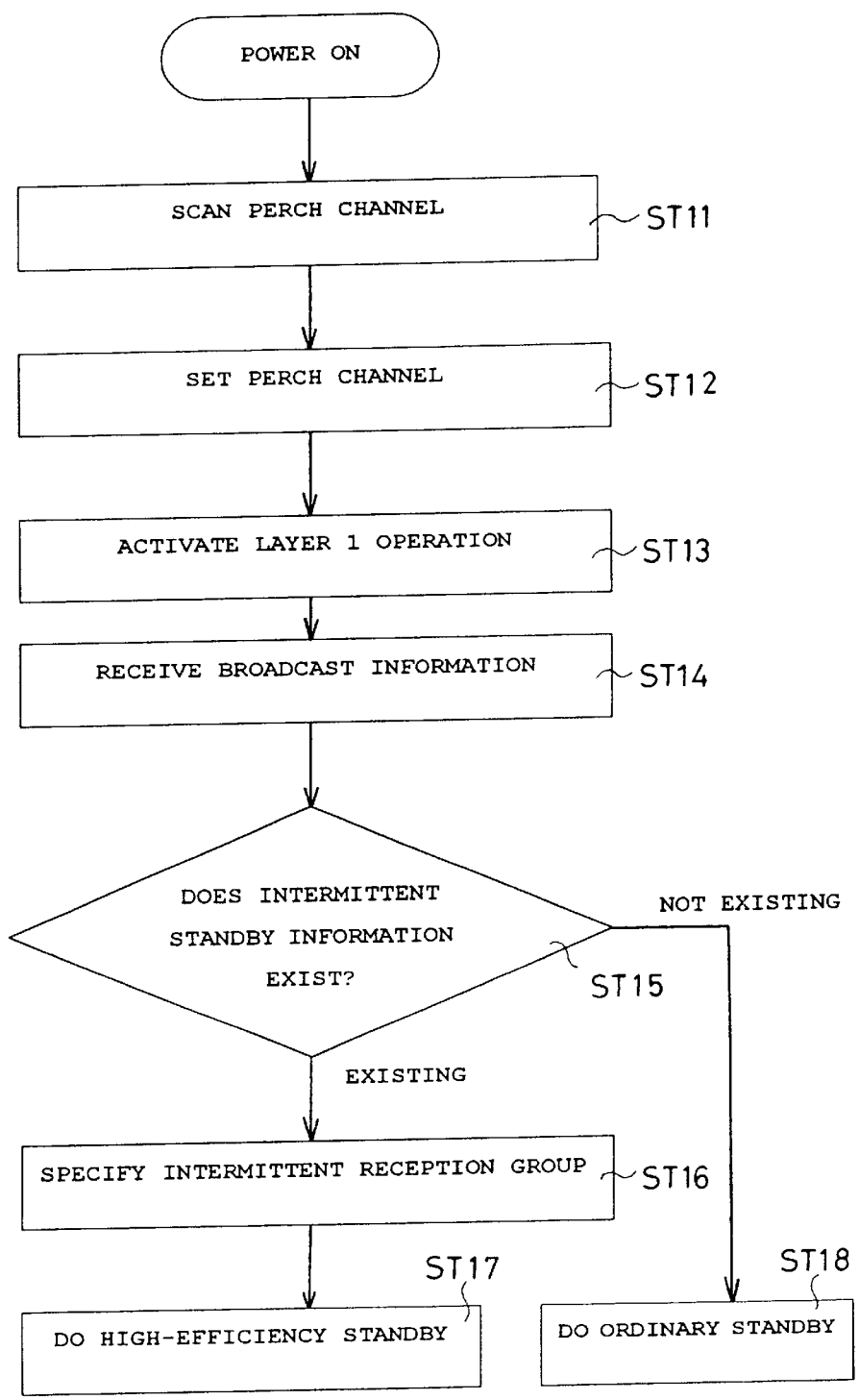
FIG. 6 is a flowchart illustrating an operation performed after the power source of the mobile station is turned on, in which operation the mobile station enters its standby mode in the first embodiment of the present invention shown in FIG. 1.

FIG. 6 is a flowchart illustrating an operation performed after the power source of the mobile station 15 is turned on, in which operation the mobile station 15 enters its standby mode in the first embodiment of the present invention.

In the flowchart shown in FIG. 6, when the power source of the mobile station 15 is turned on, perch channels stored in a ROM and like memory means of the mobile station 15 are scanned in a step ST11, as is in the case of the mobile station 15 not capable of performing the high-efficiency intermittent reception operation.

Then, the step ST11 is followed by a subsequent step ST12, in which a table of the channels each clearing a casting-out level is prepared in the order of channels, so that the perch channel is set. The step ST12 is immediately followed by a subsequent step ST13, in which a layer 1 operation is performed.

After that, the step ST13 is followed by a subsequent step ST14, in which the broadcast information is received. In receiving the broadcast information, also received are: message type; network number; restriction information; control channel structure information; and, like information. In addition to the above, further received are information elements of the intermittent standby information, provided that the information element length of the extension information (i.e., K) is not zero.

When a plurality of the control channels exist, the same reception operation as described above is performed in the control channel in which its own unit 15 should stay. Then, the step ST14 is followed by a subsequent step ST15, in which it is judged whether or not the intermittent standby information exists.

When both the information element length of the extension information (i.e., K) and the information element of the intermittent standby information exist in the broadcast information having been received, the step ST15 is followed by a subsequent step ST16, in which the intermittent reception group of its own unit 15 is specified on the basis of the value of the intermittent standby superframe interval (i.e., Pi) contained in the information element of the intermittent standby information.

After that, the step ST16 is followed by a subsequent step ST17, in which the hyperintermittent reception operation is performed on the basis of the intermittent standby information. In the step ST15, when the information element of the intermittent standby information is not contained in the broadcast information having been received, the step ST15 goes to a step ST18, in which an ordinary standby operation is performed. In this connection, the intermittent reception group is specified in the same manner as that used in determining the intermittent superframe reception group (i.e., Is) in the above.

Figure 7:
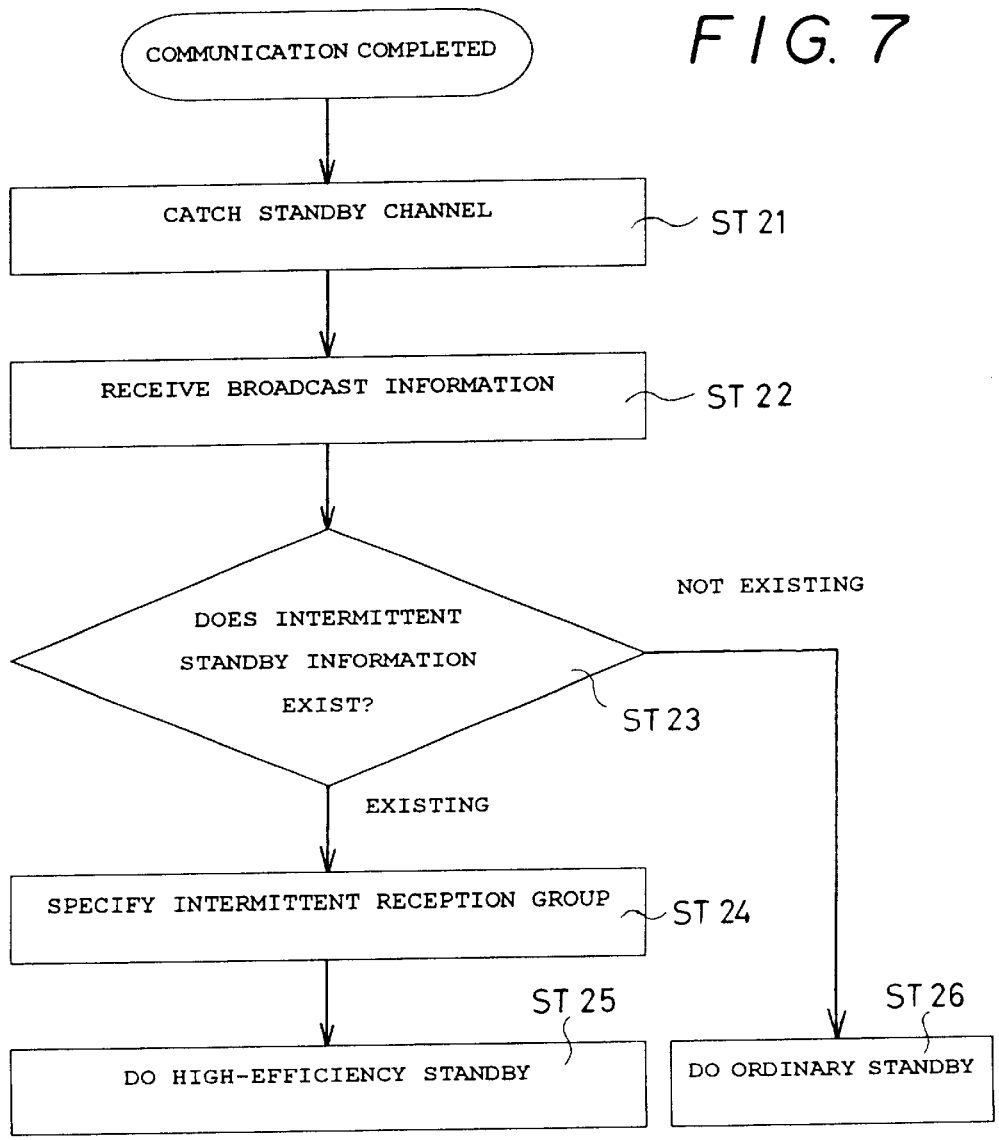
FIG. 7 is a flowchart illustrating an operation performed after completion of telecommunication of the mobile station, in which operation the mobile station enters in its standby mode in the first embodiment of the present invention shown in FIG. 1.

FIG. 7 is a flowchart illustrating an operation performed after completion of telecommunication of the mobile station 15, in which operation the mobile station 15 enters its standby mode in the first embodiment of the present invention.

As shown in FIG. 7, after completion of telecommunication of the mobile station 15 in the first embodiment of the present invention, in a step ST21 the mobile station 15 catches a standby channel upon disconnection of such telecommunication, on the basis of the contents of a layer 3 system information message which is received when the telecommunication is disconnected.

After that, the step ST21 is followed by a subsequent step ST22, in which: the broadcast information is received as is in the flowchart of FIG. 6 starting from the POWER ON; in addition to reception of the message type, network number, restriction information, control channel structure information and like information, the information element of the intermittent standby information is received when the information element length of the extension information (i.e., K) is not zero. Further, in case that a plurality of the control channels exist, the same reception operation is performed in the control channel in which its own mobile station 15 should stays.

Then, the step ST22 is followed by a subsequent step ST23, in which it is judged whether or not the intermittent standby information exist. In case that the information element length of the extension information (i.e., K) is not equal to zero in the broadcast information having been received, and that the information element of the intermittent standby information exist in such broadcast information, the step ST23 is followed by a subsequent step ST24, in which the intermittent reception group of its own mobile station 15 is specified on the basis of a value of the intermittent standby superframe interval (i.e., Pi) contained in the information element of the intermittent standby information.

After that, the step ST24 is followed by a subsequent step ST25, in which the hyperintermittent reception operation is performed based on the intermittent standby information. On the other hand, in the step ST23, when any information element of the intermittent standby information is not found in the broadcast information having been received, the step ST23 goes to a step ST26, in which an ordinary standby operation is performed.

Figure 8:
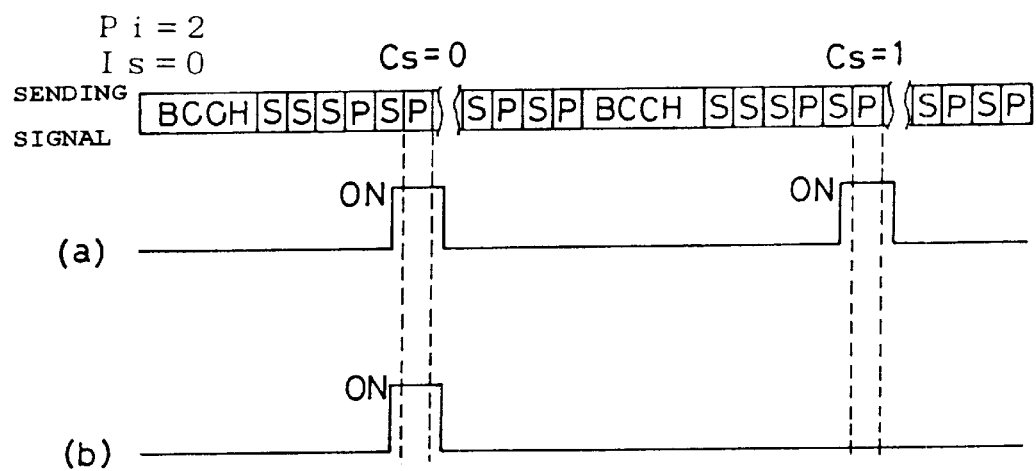
FIG. 8(a) is a timing chart illustrating the conventional intermittent reception operation of the mobile station in its standby mode.
FIG. 8(b) is a timing chart illustrating the intermittent reception operation of the mobile station in its standby mode in the first embodiment of the present invention shown in FIG. 1.

FIG. 8(b) is a timing chart illustrating the intermittent reception operation of the mobile station 15 in its standby mode in the first embodiment of the present invention. Incidentally, in FIG. 8(b): the reference character BCCH denotes a broadcast channel; S a separate cell channel (i.e., SCCH); and, P a paging channel (i.e., PCH).

As shown in FIG. 8(b), in the high-efficiency intermittent reception operation which is performed at a time of the POWER ON shown in FIG. 6 or performed after completion of telecommunication shown in FIG. 7, for example, when the value of the intermittent standby superframe interval (i.e., Pi) is 2 and the intermittent superframe reception group (i.e., Is) is zero, the reception portion of the mobile station 15 is turned on so as to receive the paging channel when a value of the intermittent standby superframe counter (i.e., Cs) is zero; and, after two superframe intervals (i.e., 720 milliseconds×2), the reception portion of the mobile station 15 is turned on again.

Incidentally, the mobile station 15 performing the high-efficiency intermittent reception operation receives periodically the broadcast information for realizing synchronization of the intermittent standby superframe counter (i.e., Cs). At this time, though a timing in such periodical reception operation is arbitrarily determined, it is possible to perform such periodical reception operation at intervals of 5 minutes at maximum.

Further, in order to enable the mobile station 15 to perform the high-efficiency intermittent reception operation even when in roaming state, any roaming of the mobile station 15 into other network provider groups is not included here when availability of the high-efficiency intermittent reception operation is judged.

In the digital wireless telephone system 10 of the present invention having the above construction, when a request-to-receive is made to the mobile station 15 which is capable of performing the high-efficiency intermittent reception operation, the telephone exchange retrieves both the location information and the subscriber's information from the subscriber's information memory 13, and further concurrently retrieves information from the intermittent standby allowed/not allowed information memory means 13a.

Then, the subscriber's information discrimination means 12b judges availability of the intermittent standby operation. As a result, when it is judged that the intermittent standby operation is available, the intermittent reception group analyzing means 12d specifies the intermittent reception group on the basis of both the intermittent standby superframe interval (i.e., Pi), which has been set in the intermittent reception extension information setting means 12c, and the intermittent standby superframe counter (i.e., Cs).

Then, the paging message is transmitted from the message sending means 12e to the mobile station 15 through both the mobile communication switching unit 12a and the base station 14 in the intermittent superframe reception group (i.e., Is) and the PCH group (i.e., Ip) of the control channel, which groups (i.e., Is and Ip) the mobile station 15 is waiting for. After its power source is turned on, the mobile station 15 performs its ordinary operations such as: a perch channel scanning operation; a perch channel setting operation; and, a layer 1 operation.

After that, the mobile station 15 receives the broadcast information in its ordinary broadcast information reception operation. Further, the mobile station 15 performs an additional reception operation for receiving the information element of the intermittent standby information when the value of the information element length of the extension information (i.e., K) is not equal to zero.

When the broadcast information having been received contains the information element of the intermittent standby information, the intermittent reception group is specified based on the intermittent standby superframe interval (i.e., Pi). Then, the mobile station 15 enters its high-efficiency intermittent reception mode in the thus specified intermittent reception group.

On the other hand, after completion or disconnection of telecommunication, the mobile station 15 catches a standby channel for performing the standby operation after such disconnection, on the basis of the contents of a layer 3 system information message obtained at a time of the disconnection.

After that, the ordinary broadcast information reception operation is performed as described above. In addition to such broadcast information reception operation, an additional reception operation is performed to receive both the information element of the extension information (i.e., K) and the information element of the intermittent standby information.

In this case, when the information element of the intermittent standby information is contained in the broadcast information thus received, the intermittent reception group is specified on the basis of its intermittent standby superframe interval (i.e., Pi), so that the mobile station 15 enters the high-efficiency intermittent reception mode in such intermittent reception group.

Consequently, in the high-efficiency intermittent reception operation of the mobile station 15 in the first embodiment of the present invention, it is possible to perform the intermittent reception operation at intervals equal to 15 superframe intervals at maximum as to the intermittent standby superframe interval (i.e., Pi), on the basis of the intermittent standby information having been arbitrarily set. Consequently, it is possible to increase the continuous standby period of time of the mobile station 15, and, therefore possible to reduce its power consumption by increasing the interval of the intermittent reception operation.

Figure 9:
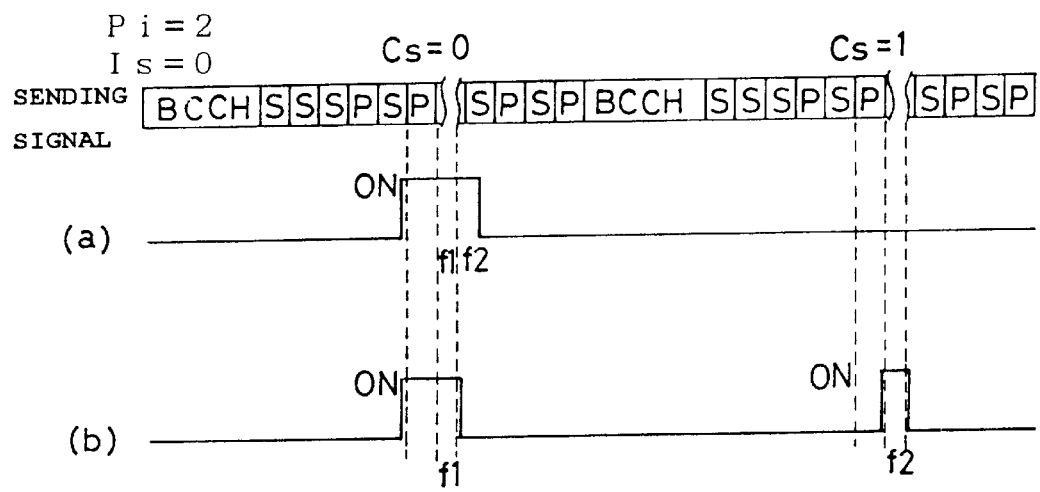

FIGS. 9(a) and 9(b) are timing charts each illustrating the intermittent standby operation based on measurement of the peripheral zone when the mobile station 15 performs its high-efficiency intermittent reception operation in the first embodiment of the present invention, wherein: FIG. 9(a) shows the perch channels measured at two frequencies (i.e., f1 and f2) in the peripheral zone immediately after receipt of information of the paging channel (i.e., PCH); and, FIG. 9(b) shows the perch channels measured at a first and a second frequency (i.e., f1 and f2, respectively) in a first and a second superframe, respectively. Incidentally, in FIGS. 9(a) and 9(b), the reference characters BCCH, S and P are the same as those described with reference to FIGS. 8(a) and 8(b).

Now, a method for measuring a first peripheral zone will be described.

In this method, after the mobile station 15 receives the information of the paging channel (i.e., PCH) when in its high-efficiency intermittent reception mode, the perch channels of the peripheral zone are measured, provided that the number of the perch channels to be measured is the same value as that of the intermittent standby superframe interval (i.e., Pi).

For example, in case that the Pi is equal to 2 (i.e., Pi=2), as shown in FIG. 9(a), two frequencies (i.e., f1 and f2) of the perch channels in the peripheral zone are measured immediately after reception of the information of the paging channel (i.e., PCH). Further, in case that the Pi is equal to 3 (i.e., Pi=3), three frequencies (i.e., f1, f2 and f3) of the perch channels in the peripheral zone are measured immediately after reception of the information of the paging channel (i.e., PCH).

Then, a method for measuring a second peripheral zone will be described. In this method, when the mobile station 15 is in the high-efficient intermittent reception mode, the perch channels in the peripheral zone are measured in each one of the superframes irrespective of any value of the intermittent standby superframe interval (i.e., Pi). For example, when the Pi is equal to 2 (i.e., Pi=2), as shown in FIG. 9(b), one frequency (i.e., f1) of the perch channel is measured in the first superframe, and then another frequency (i.e., f2) is measured in the subsequent second superframe.

As for measurement of the peripheral zones, the mobile station 15 is capable of carrying out any one of the above methods for measuring the first and the second zones.

Incidentally, the above embodiment of the present invention has been described in a manner such that: the subscriber's information memory 13 is provided with the intermittent standby allowed/not allowed information memory means 13a; the flag indicating availability of the intermittent standby operation is stored in the intermittent standby allowed/not allowed information memory means 13a; and, the subscriber's information discrimination means 12b judges whether or not the intermittent standby operation of the mobile station 15 is available.

In the above embodiment of the present invention, however, it is also possible to eliminate both the intermittent standby allowed/not allowed information memory means 13a and the subscriber's information discrimination means 12b since the network is capable of calling up the mobile station 15 at any time slot, provided that the network can find out the time slot which the mobile station 15 is waiting for.

Further, in the above embodiment of the present invention, though: a length of the information element of the extension information (i.e., K) is defined to be equal to 1 (i.e., K=1); and, the information elements of the intermittent standby information are defined in a manner such that a value of the intermittent standby superframe interval (i.e., Pi) is defined to be 4 bits and a value of the intermittent standby superframe counter (i.e., Cs) is defined to be 4 bits, all the above information elements are not necessarily defined as described above. In other words, they may be arbitrarily defined, if necessary.

Figure 10:
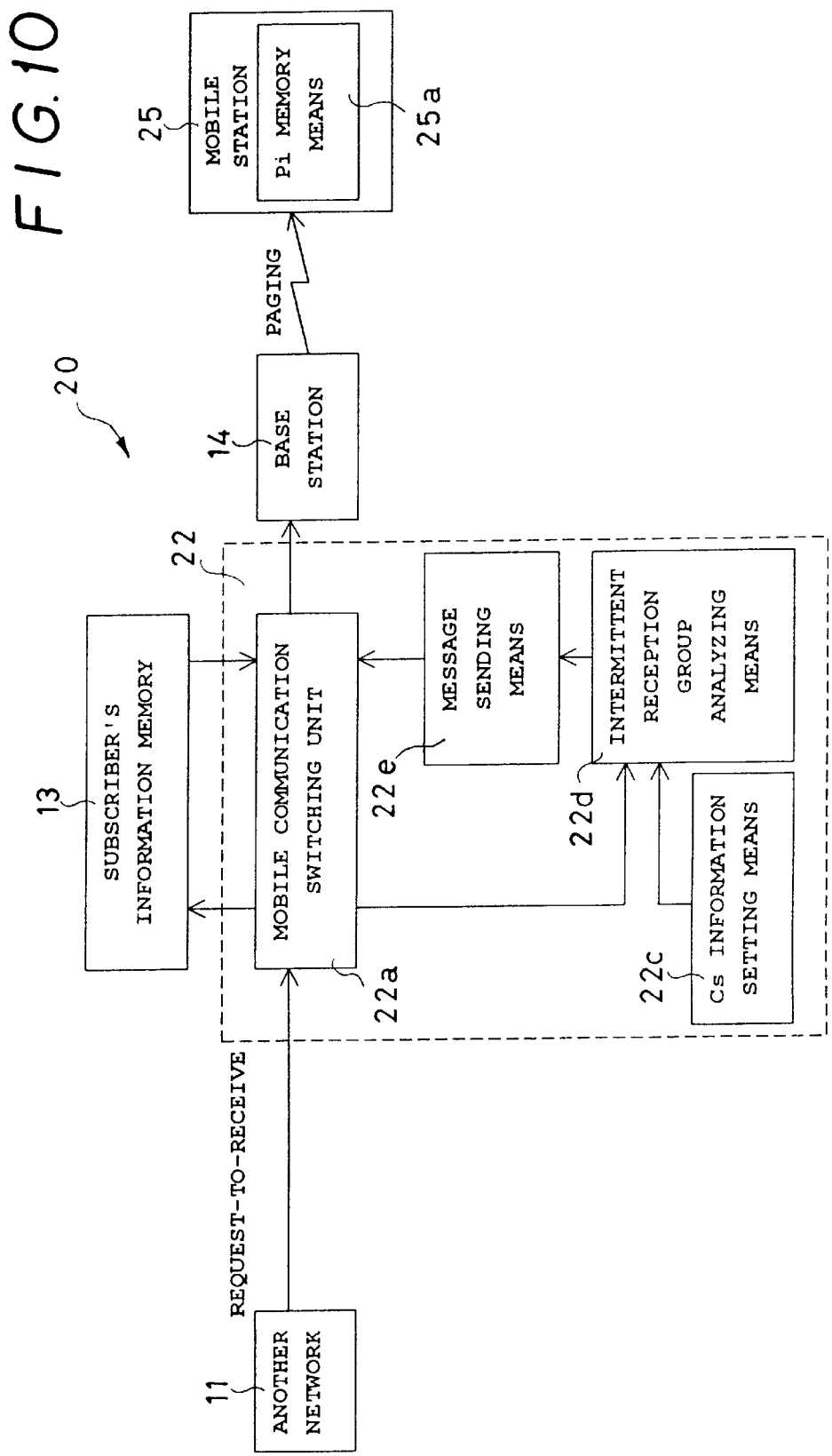
FIG. 10 is a schematic block diagram of the digital wireless telephone system of a second embodiment of the present invention.
Figure 13:
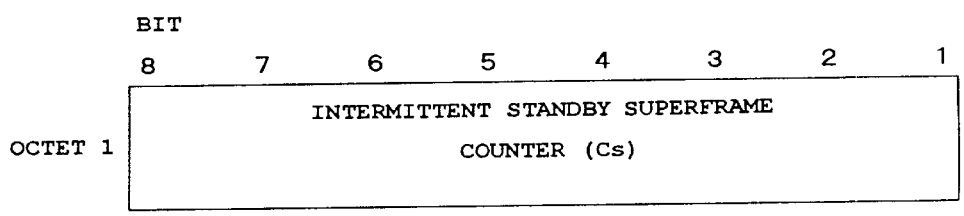
FIG. 13 is a diagram illustrating the information element of the intermittent standby superframe counter in the second embodiment of the present invention shown in FIG. 10.

FIG. 10 is a schematic block diagram of the digital wireless telephone system 20 of a second embodiment of the present invention, and FIG. 13 is a diagram illustrating the information element of the intermittent standby superframe counter in the second embodiment of the present invention. Incidentally, in FIGS. 10 and 13, the parts which are the same as ones in FIG. 1 have been given the same reference numerals/characters and are not further explained.

In the digital wireless telephone system 20 of the present invention shown in FIG. 10, a telephone exchange 22 comprises: a mobile communication switching unit 22a for radio-controlling the base station 14 having a radio zone in which a mobile station 25 stays, the mobile communication switching unit 22a also providing a telecommunication service to the mobile station 25 through the base station 14; a Cs information setting means 22c for setting the intermittent standby superframe counter information contained in the broadcast information (i.e., BCCH information) which should be broadcast to all the mobile station 25 staying in the cell; an intermittent reception group analyzing means 22d for analyzing an intermittent reception group of the mobile stations 25 having received such information (i.e., BCCH); and, a message sending means 22e for sending paging information through the mobile communication switching unit 22a.

The mobile station 25 of the second embodiment of the present invention is provided with a Pi memory means 25a for storing an intermittent standby superframe interval having been previously set. In this second embodiment of the present invention, the intermittent standby superframe counter is previously set in the information element of the extension information by means of the Cs setting means 22c, which extension information is contained in the broadcast information.

In other words, as shown in FIG. 13, in the second embodiment of the present invention: a length of the information element of the extension information (i.e., K) contained in the broadcast information is defined to be equal to 1 (i.e., K=1); and, a length of the information element of the intermittent standby superframe counter (i.e., Cs) is defined to be equal to 1 octet. Such value of the intermittent standby superframe counter (i.e., Cs) increases from zero to Pi−1 as is in the case of the first embodiment of the present invention. When the value of the intermittent standby superframe counter (i.e., Cs) reaches the Pi−1, a subsequent value of the counter (i.e., Cs) becomes zero. In construction, the remaining parts of the second embodiment of the present invention are the same as those of the first embodiment of the present invention.

In the digital wireless telephone system 20 of the present invention having the above construction, when a request-to-receive is made to the mobile station 25: the telephone exchange 22 retrieves both the location information and the subscriber's information from the subscriber's information memory 13; the intermittent reception group analyzing means 22d analyzes both the intermittent superframe reception group (i.e., Is) and the PCH group; and, the message sending means 22e sends a message to the mobile station 25 through both the mobile communication switching unit 22a and the base station 14. After its power source is turned on, the mobile station 25 performs its ordinary operations such as: a perch channel scanning operation; a perch channel setting operation; and, a layer 1 operation.

After that, the mobile station 25 receives the broadcast information in its ordinary broadcast information reception operation. Further, the mobile station 25 performs an additional reception operation for receiving both the information element length of the extension information (i.e., K) and the information element of the intermittent standby superframe counter.

In case that: the broadcast information having been received does not contain any of the information element length of the extension information (i.e., K) and the information element of the intermittent standby superframe counter; and, the high-efficiency intermittent reception operation is not available, the mobile station 25 performs an ordinary standby reception operation.

When the broadcast information having been received contains both the information element length of the extension information (i.e., K) and the information element of the intermittent standby superframe counter, the intermittent reception group of its own mobile station 25 is specified based on the value of the intermittent standby superframe interval having been stored in the Pi memory means 25a of the mobile station 25.

Then, the mobile station 15 enters the high-efficiency intermittent reception mode in the thus specified intermittent reception group. On the other hand, after completion or disconnection of telecommunication, the mobile station 25 catches a standby channel, which the mobile station 25 is waiting for after the above disconnection, on the basis of the contents of a layer 3 system information message obtained at a time of the disconnection of telecommunication.

After that, the ordinary broadcast information reception operation is performed as described above. In addition to such broadcast information reception operation, an additional reception operation is performed to receive both the information element length of the extension information (i.e., K) and the information element of the intermittent standby superframe counter.

In this case, when both the information element length of the extension information (i.e., K) and the information element of the intermittent standby superframe counter are contained in the broadcast information thus received, the intermittent reception group is specified on the basis of the intermittent superframe interval (i.e., Pi), so that the mobile station 25 enters the high-efficiency intermittent reception mode in such intermittent reception group.

Consequently, as is in the first embodiment of the present invention, the high-efficiency intermittent reception operation of the mobile station 25 is available also in the second embodiment of the present invention. As a result, it is possible to increase the continuous standby period of time of the mobile station 25, and, therefore possible to reduce the power consumption of the mobile station 25.

In this second embodiment of the present invention, the subscriber's information memory 13 is not required to have information as to availability of the high-efficiency intermittent standby operation of each of the subscribers. Incidentally, the same method for measuring the peripheral zone as that of the first embodiment of the present invention is also used in the second embodiment of the present invention in a condition in which the mobile station 25 is in the high-efficiency intermittent standby mode. More particularly, the above method for measuring the peripheral zone may be either the method for measuring the first peripheral zone or the method for measuring the second peripheral zone.

Figure 11:
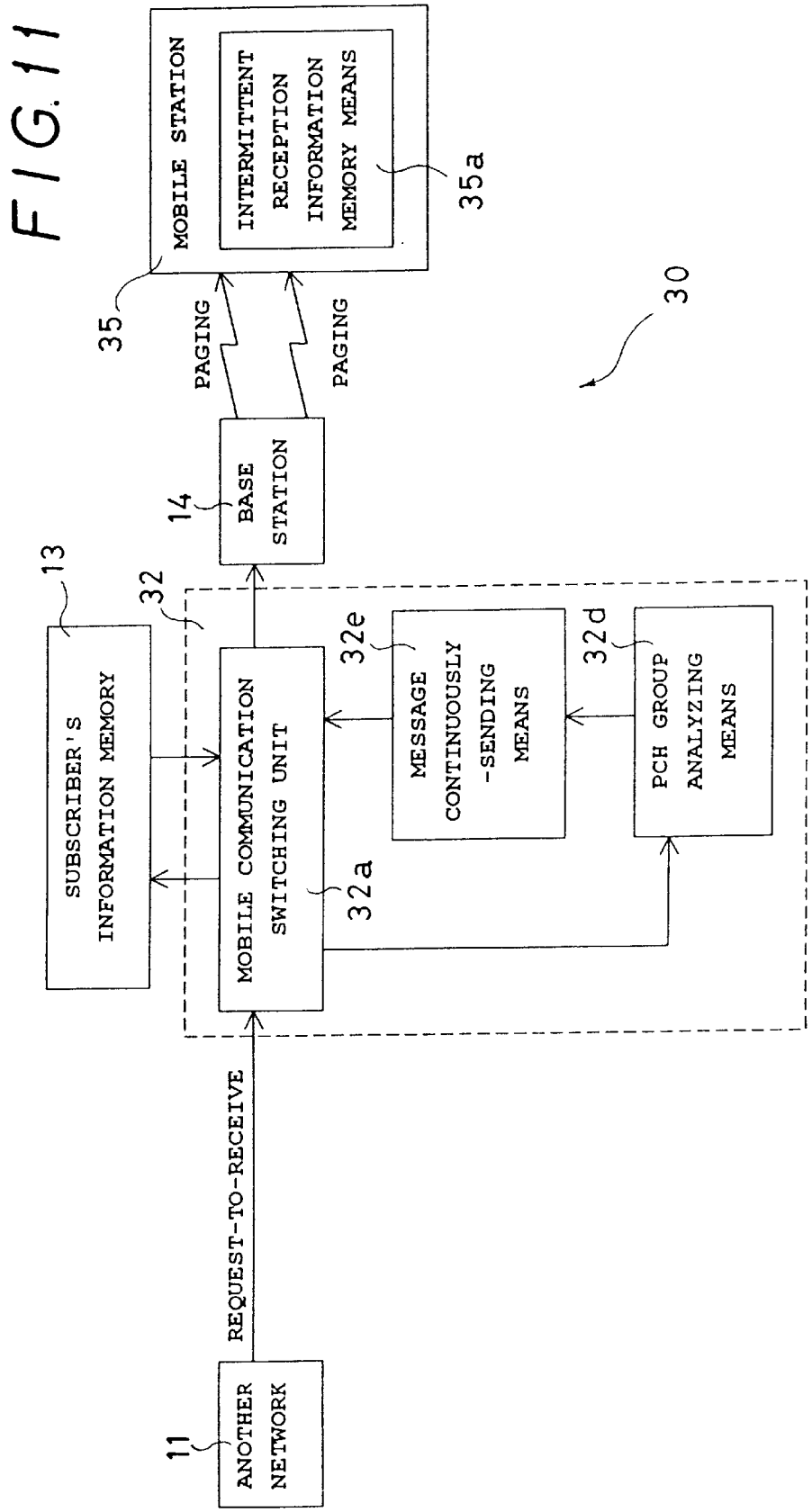
FIG. 11 is a schematic block diagram of the digital wireless telephone system of a third embodiment of the present invention.

FIG. 11 is a schematic block diagram of the digital wireless telephone system of a third embodiment of the present invention. Incidentally, in FIG. 11, the parts, which are the same as ones in FIG. 1 showing the first embodiment of the present invention, have been given the same reference numerals/characters and are not further explained.

In the digital wireless telephone system 30 of the present invention shown in FIG. 11, a telephone exchange 32 comprises: a mobile communication switching unit 32a for radio-controlling the base station 14 having a radio zone in which a mobile station 35 stays, the mobile communication switching unit 32a also providing a telecommunication service to the mobile station 35 through the base station 14; a PCH group analyzing means 32d for analyzing the paging channel group; and, a message continuously-sending means 32e for continuously sending the paging message through the mobile communication switching unit 32a for a period of time equal to a plurality of superframes, the number of which is the same as that of the Pi's.

Further, the mobile station 35 of the third embodiment of the present invention is provided with an intermittent reception information memory means 35a, which stores intermittent reception information such as an intermittent standby superframe interval and like information having been previously set. In construction, the remaining parts of the third embodiment of the present invention are the same as those of the first embodiment of the present invention.

In the digital wireless telephone system 30 of the present invention having the above construction, when a request-to-receive is made to the mobile station 35, the telephone exchange 32 specifies, as is in the case of an ordinary telephone call, a radio zone in which the mobile station 35 thus called stays. After completion of specifying the radio zone, the PCH group is analyzed by the PCH group analyzing means 32d. The message continuously-sending means 32e continuously sends the paging message to the mobile station 35 through both the mobile communication switching unit 32a and the base station 14 for a period of time equal to a plurality of superframes, the number of which is the same as that of the Pi's.

After its power source is turned on, the mobile station 35 performs its ordinary operations such as: a perch channel scanning operation; a perch channel setting operation; and, a layer 1 operation. After that, the mobile station 35 receives the broadcast information in its ordinary broadcast information reception operation.

Further, the mobile station 35 compares the network number and the like with the high-efficiency intermittent reception information having been stored in the intermittent reception information memory means 35a.

When the high-efficiency intermittent reception operation is available, the mobile station 35 initiates the high-efficiency intermittent reception operation.

On the other hand, after completion or disconnection of telecommunication, the mobile station 35 catches a standby channel, which the mobile station 35 is waiting for after the above disconnection, on the basis of the contents of a layer 3 system information message obtained at a time of the disconnection of telecommunication.

After that, when the high-efficiency intermittent reception operation is available, the mobile station 35 initiates the high-efficiency intermittent reception operation. On the other hand, when the high-efficiency intermittent reception operation is not available, the mobile station 35 performs an ordinary standby reception operation.

Consequently, as is in the first embodiment of the present invention, the high-efficiency intermittent reception operation of the mobile station 35 is available also in the third embodiment of the present invention.

As a result, it is possible to increase the continuous standby period of time of the mobile station 35, and, therefore possible to reduce the power consumption of the mobile station 35.

In this third embodiment of the present invention, it is possible for the mobile station 35 to perform the high-efficiency intermittent reception operation without involving any time delay for a telephone call when the telephone exchange 32 continuously sends the paging message for a period of time equal to a plurality of the superframes, the number of which is the same as that of the Pi's.

Further, in the side of the network, there is no need for specifying the intermittent superframe reception group (i.e., Is). Incidentally, the same method for measuring the peripheral zone as that of the first or the second embodiment of the present invention is also used in the third embodiment of the present invention in a condition in which the mobile station 35 is in the high-efficiency intermittent reception mode. More particularly, the above method for measuring the peripheral zone may be either the method for measuring the first peripheral zone or the method for measuring the second peripheral zone.

Figure 12:
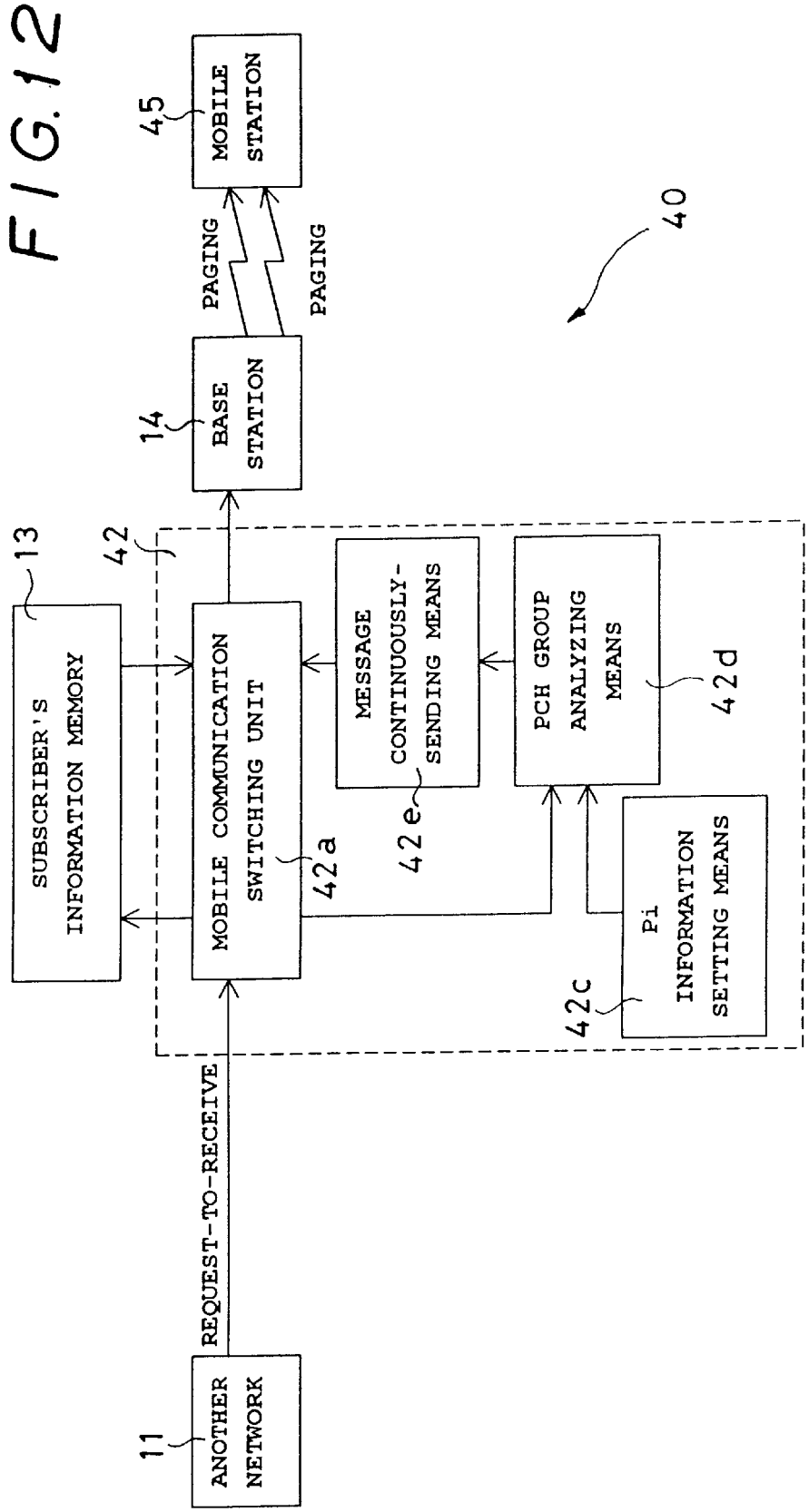
FIG. 12 is a schematic block diagram of the digital wireless telephone system of a fourth embodiment of the present invention.
Figure 14:
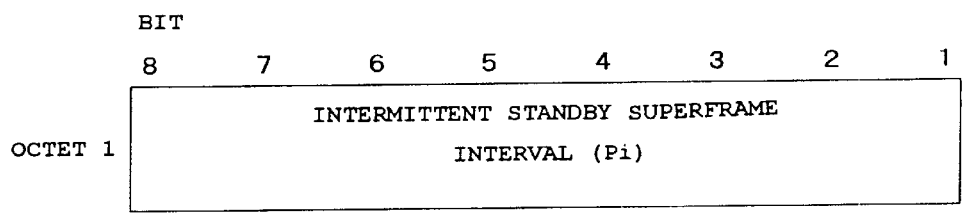
FIG. 14 is a diagram illustrating the information element of the intermittent standby superframe interval in the fourth embodiment of the present invention shown in FIG. 10.

FIG. 12 is a schematic block diagram of the digital wireless telephone system 40 of a fourth embodiment of the present invention, and FIG. 14 is a diagram illustrating the information element of the intermittent standby superframe interval in the fourth embodiment of the present invention. Incidentally, in FIG. 12, the parts which are the same as ones in FIG. 1 have been given the same reference numerals/characters and are not further explained.

In the digital wireless telephone system 40 of the present invention shown in FIG. 12, a telephone exchange 42 comprises: a mobile communication switching unit 42a for radio-controlling the base station 14 having a radio zone in which a mobile station 45 stays, the mobile communication switching unit 42a also providing a telecommunication service to the mobile station 45 through the base station 14; a Pi information setting means 42c for setting the intermittent standby superframe interval information contained in information (i.e., BCCH information) which should be broadcast to all the mobile station 45 staying in the cell; a PCH group analyzing means 42d for analyzing the paging channel group; and, a message continuously-sending means 42e for continuously sending the paging message through the mobile communication switching unit 42a for a period of time equal to a plurality of superframes, the number of which is the same as that of the Pi's.

Further, in this fourth embodiment of the present invention, the intermittent standby superframe interval is previously set by means of the Pi setting means 42c in the information element of the extension information contained in the broadcast information.

In other words, as shown in FIG. 14, in the fourth embodiment of the present invention: a length of the information element of the extension information (i.e., K) contained in the broadcast information is defined to be equal to 1 (i.e., K=1); and, a length of the information element of the intermittent standby superframe interval (i.e., Pi) is defined to be equal to 1 octet. In construction, the remaining parts of the fourth embodiment of the present invention are the same as those of the first embodiment of the present invention.

In the digital wireless telephone system 40 of the present invention having the above construction, when a request-to-receive is made to the mobile station 45: the telephone exchange 42 specifies a radio zone in which the mobile station 45 thus called stays.

After completion of specifying the radio zone, the PCH group is analyzed by the PCH group analyzing means 42d. The message continuously-sending means 42e continuously sends the paging message to the mobile station 45 through both the mobile communication switching unit 42a and the base station 14 for a period of time equal to a plurality of superframes, the number of which is the same as that of the Pi's.

After its power source is turned on, the mobile station 45 performs its ordinary operations such as: a perch channel scanning operation; a perch channel setting operation; and, a layer 1 operation. After that, the ordinary broadcast information reception operation is performed. In addition to such broadcast information reception operation, an additional reception operation is performed to receive both the information element length of the extension information (i.e., K) and the information element of the intermittent standby superframe interval.

In this case, when both the information element length of the extension information (i.e., K) and the information element of the intermittent standby superframe interval are contained in the broadcast information thus received, the mobile station 45 performs its high-efficiency intermittent reception operation on the basis of a value of the Pi in the information element of the intermittent standby superframe interval. At this time, the network continuously sends out the paging signal for a period of time equal to a plurality of the superframes, the number of which is the same as that of the Pi's.

Consequently, in the mobile station 45 there is no need for synchronization of such superframes. On the other hand, after completion or disconnection of telecommunication, the mobile station 45 catches a standby channel, which the mobile station 35 is waiting for after the above disconnection, on the basis of the contents of a layer 3 system information message obtained at a time of the disconnection.

After that, the ordinary broadcast information reception operation is performed. In addition to such broadcast information reception operation, an additional reception operation is performed to receive both the information element length of the extension information (i.e., K) and the information element of the intermittent standby superframe interval.

When both the information element length of the extension information (i.e., K) and the information element of the intermittent standby superframe interval are contained in the broadcast information thus received, the mobile station 45 performs its high-efficiency intermittent standby reception operation on the basis of the value of the Pi. At this time, as is in the above, the network is not required to synchronize all the superframes.

Incidentally, when the high-efficiency intermittent reception operation is not available, the mobile station 45 performs an ordinary standby reception operation. Consequently, as is in the first embodiment of the present invention, the mobile station 45 is capable of performing the high-efficiency intermittent reception operation in the fourth embodiment of the present invention. As a result, it is possible to increase the continuous standby period of time of the mobile station 45, which reduces the power consumption of the mobile station 45.

In this fourth embodiment of the present invention, the telephone exchange 42 continuously sends out the paging message for a period of time equal to a plurality of the superframes, the number of which is the same as that of the Pi's. Consequently, it is possible for the mobile station 45 to perform the high-efficiency intermittent reception operation without involving any time delay for a telephone call.

Further, inside the network, there is no need for specifying the intermittent superframe reception group (i.e., Is). Incidentally, the same method for measuring the peripheral zone as that of the first or the second embodiment of the present invention is also used in the fourth embodiment of the present invention in a condition in which the mobile station 45 is in the high-efficiency intermittent reception mode. More particularly, the above method for measuring the peripheral zone may be either the method for measuring the first peripheral zone or the method for measuring the second peripheral zone.

In a fifth embodiment, high-efficiency intermittent reception is initiated on condition that prescribed values of bit error rate (BER), of reception level or of both the BER and the reception level are satisfied for a prescribed period of time, in order that the mobile station perform high efficiency intermittent reception under more stable conditions.

The mobile station measures the BER and the reception level, and advances a counter (not shown)if both the values of the BER and the reception level reach prescribed values and if both the BER and the reception level exceed the prescribed values until the next superframe appears. The mobile station meets the criteria for starting high-efficiency intermittent reception if the value of the counter is greater than a prescribed value.

By our experiment, as for the reception level, the most preferred condition is that the reception level be greater than 16 dB. and last for a period of 9 or more superframes. With regard to the BER, the most preferred condition is that the BER be under 0.3% and last for a period of 9 or more superframes.

Figure 15:
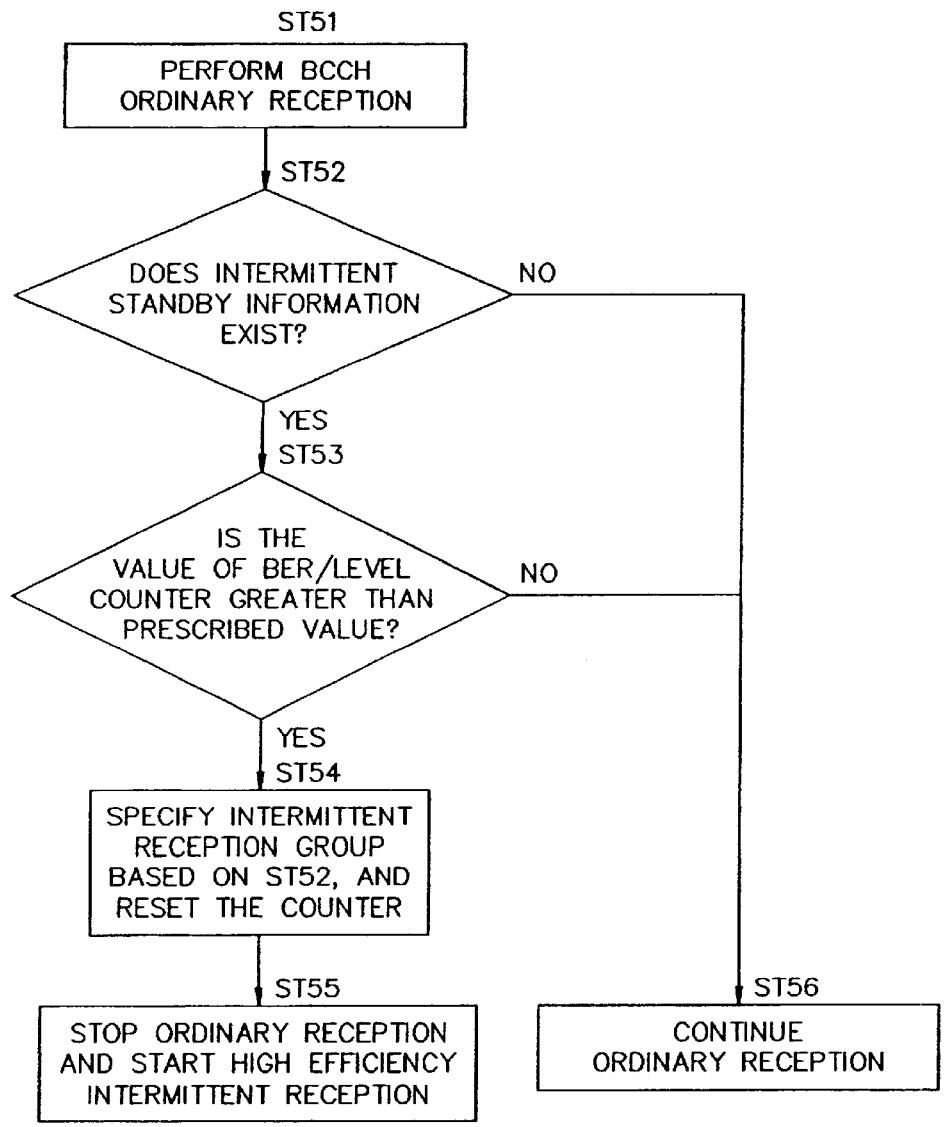
FIG. 15 is a flow diagram illustrating an operation for starting high efficiency intermittent reception, according to a fifth embodiment of the present invention.

FIG. 15 is a flowchart illustrating an operation performed while the mobile station is in ordinary intermittent reception before high-efficiency intermittent reception is initiated (ST51). As shown in FIG. 5, FIG. 6, and FIG. 7, the mobile station recognizes the intermittent standby information, and prepares to perform high-efficiency intermittent reception (ST52). The mobile station analyzes the BER and the reception level, and the counter in the mobile station counts the period for which the BER and the reception level exceed prescribed values. The counter advances whenever both of the prescribed values are satisfied. If the count of the counter is greater than a prescribed value (ST53), the mobile station specifies an intermittent reception group (ST54), and performs high-efficiency intermittent reception (ST55). If the counter is not over the prescribed value, the mobile station keeps performing ordinary reception (ST56).

As a result of above process, the mobile station performs more stable high-efficiency intermittent reception than the preceding embodiments.

In a sixth embodiment, the high-efficiency intermittent reception is stopped and the mobile station performs ordinary intermittent reception on a condition that the prescribed values of BER, of reception level or of both of them are unsatisfied in order that mobile station could perform high-efficiency intermittent reception under more stabilized conditions.

The mobile station recognizes whether intermittent standby information exists or not, as in the other embodiments. If it does not exist, it stops the high-efficiency intermittent reception and performs ordinary intermittent reception.

The mobile station measures the BER, the reception level, and advances a counter (not shown) if either the BER or the reception level fails to reach a prescribed value which lasts until the next superframe appears. If the value of counter is over a prescribed value it means that the mobile station has an inappropriate BER or reception level and the high-efficiency intermittent reception should be stopped, and the ordinary intermittent reception should be performed.

By our experiment, as for the reception level, the most preferred condition for stopping high-efficiency intermittent operation is when the reception level is under 10 dB, and it lasts for a period of 9 or more superframes. With regard to the BER, the most preferred condition is that the BER is over 0.3% and it lasts for a period of 9 or more superframes.

Figure 16:
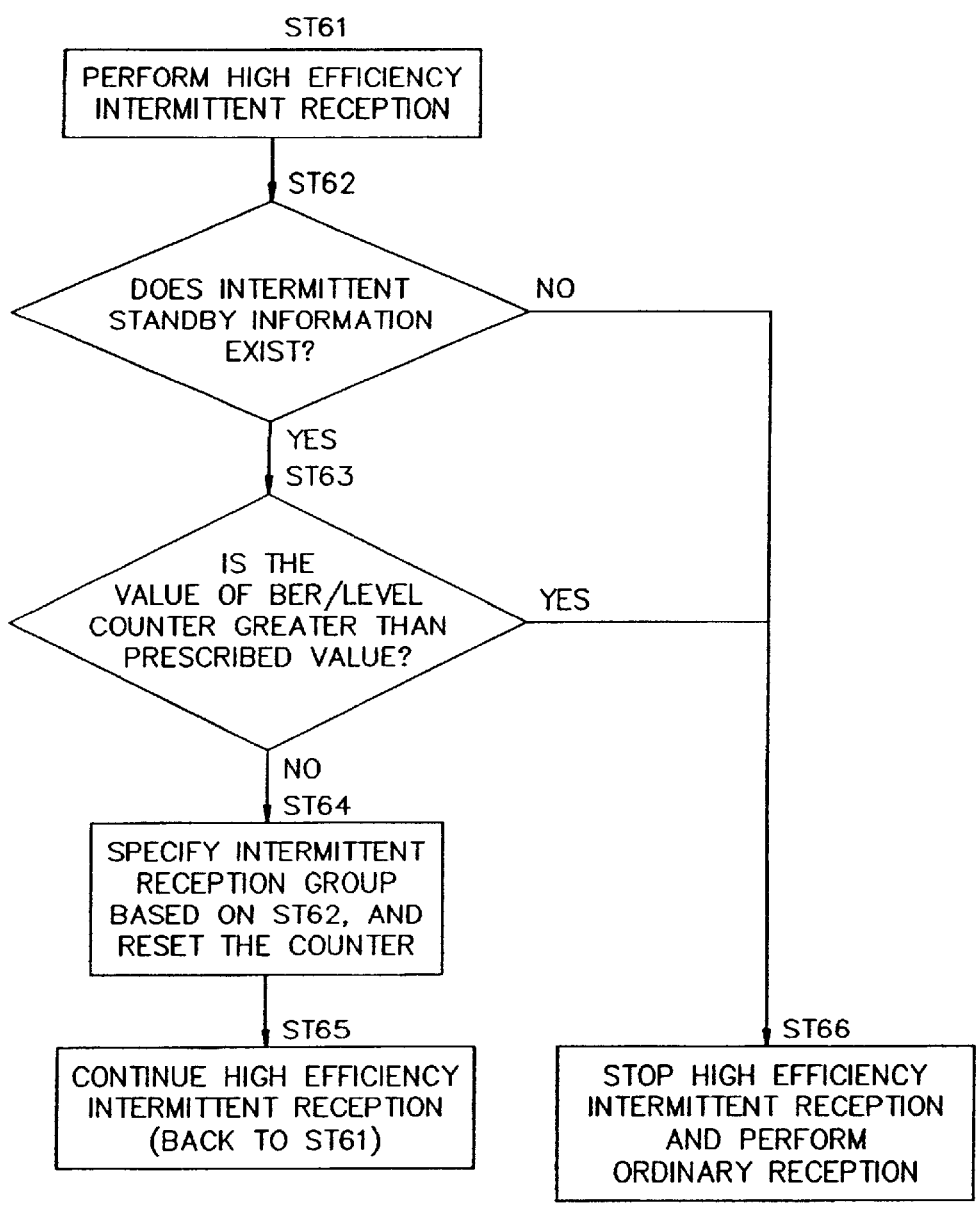
FIG. 16 is a flow diagram illustrating an operation for stopping high efficiency intermittent reception, according to a sixth embodiment of the present invention.

FIG. 16 is a flowchart illustrating an operation performed while the mobile station is performing high-efficiency intermittent operation (ST61). In this case the mobile station keeps measuring the BER, and the reception level. At step ST62, the mobile station recognizes whether the intermittent standby information exists or not (ST62) and stops the high-efficiency reception and performs ordinary intermittent reception if the intermittent standby information does not exist (ST66).

The counter advances on condition that either the BER or reception level is less than a prescribed value. If the value of the counter is over the prescribed value (ST63), the mobile station stops high efficiency intermittent reception, and performs ordinary intermittent reception (ST66). If the counter is not over the prescribed value, the mobile station keeps performing high-efficiency intermittent reception (ST65). As a result of above process, the mobile station performs more stable high-efficiency intermittent reception than the preceding embodiments.

As described above, in the present invention having the above construction, the mobile station performs the high-efficiency intermittent reception operation, which increases the interval in the intermittent reception operation, and, therefore increases the continuous standby period of time of the mobile station, so that the power consumption of the mobile station is reduced.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A digital wireless telephone system comprising a mobile station provided with a reception portion, which portion is timed in its turning-on-power operation to a paging channel contained in a sending signal issued from a telephone exchange to said mobile station through a base station, and is held in its de-energized state in the remaining period of time, wherein when an intermittent standby operation is available, said telephone exchange sends out a paging message in an intermittent superframe reception group and in a paging channel group, for which groups said mobile station is waiting; and wherein said mobile station receives broadcast information, specifies an intermittent reception group on the basis of the contents of intermittent standby information contained in said broadcast information, and performs its intermittent standby reception operation in said reception group having been thus specified, and wherein said intermittent standby reception operation reduces power consumption of said mobile station by arbitrarily controlling the interval of intermittent standby reception.

2. The digital wireless telephone system as set forth in claim 1, wherein said telephone exchange comprises:

an intermittent reception extension information setting means for setting the contents of intermittent standby information in an extension information element contained in the broadcast information;

a subscriber's information discriminating means for discriminating subscriber's information;

an intermittent reception group analyzing means for analyzing said intermittent reception group of said mobile station, on the basis of a discrimination result obtained from said subscriber's information discriminating means and of the intermittent standby information having been set by said intermittent reception extension information setting means; and a message sending means for sending out said paging message in an intermittent reception group and said paging channel group, for which groups said mobile station is waiting.

3. The digital wireless telephone system as set forth in claim 1, wherein defined as the contents of intermittent standby information in said broadcast information are:

an extension information element length; and an intermittent standby information element comprising an intermittent standby superframe interval and an intermittent standby superframe counter.

4. A digital wireless telephone system comprising a mobile station provided with a reception portion, which portion is timed in its turning-on-power operation to a paging channel contained in a sending signal issued from a telephone exchange to said mobile station through a base station, and is held in its de-energized state in the remaining period of time, wherein said telephone exchange retrieves location information and subscriber's information from a subscriber's information memory, and sends out a paging message in both an intermittent superframe reception group and a paging channel group, for which groups said mobile station is waiting; and wherein said mobile station receives broadcast information, specifies an intermittent reception group on the basis of an intermittent standby superframe interval having been set in its own unit by means of an intermittent standby superframe counter, and performs its intermittent standby reception operation in said reception group having been thus specified; and wherein said intermittent standby reception operation reduces power consumption of said mobile station by arbitrarily controlling the interval of intermittent standby reception.

5. The digital wireless telephone system as set forth in claim 4, wherein:

said telephone exchange comprises:

a Cs information setting means for setting an intermittent standby superframe counter information element in an extension information element contained in said broadcast information;

an intermittent reception group analyzing means for analyzing said intermittent reception group of said mobile station, on the basis of said location information and said subscriber's information both retrieved from a subscriber's information memory; and a message sending means for sending out said paging message in said intermittent superframe reception group and said paging channel group, for which groups said mobile station is waiting;

while said mobile station comprises:

a Pi memory means for recording said intermittent standby superframe interval.

6. A digital wireless telephone system comprising a mobile station provided with a reception portion, which portion is timed in its turning-on-power operation to a paging channel contained in a sending signal issued from a telephone exchange to said mobile station through a base station, and is held in its de-energized state in the remaining period of time, wherein wherein said telephone exchange retrieves location information and subscriber's information from a subscriber's information memory, and continuously sends out an inter-superframe paging message in a paging channel group, for which groups said mobile station is waiting, the number of said inter-superframe paging messages being the same value as that of intermittent standby superframe intervals; and wherein said mobile station receives broadcast information, and performs its intermittent standby reception operation, on the basis of both said broadcast information and the contents of intermittent standby information which contains said intermittent standby superframe interval having been set in its own unit; and wherein said intermittent standby operation reduces power consumption of said mobile station by arbitrarily controlling the interval of intermittent standby reception.

7. The digital wireless telephone system as set forth in claim 6, wherein:

said telephone exchange comprises:

a PCH group analyzing means for analyzing said paging channel group, for which group said mobile station is waiting, on the basis of said location information and said subscriber's information both retrieved from a subscriber's information memory; and a message continuously sending out means for continuously sending out an inter-superframe paging message in a paging channel group, for which group said mobile station is waiting, the number of said inter-superframe paging messages being the same value as that of intermittent standby superframe intervals;

while said mobile station comprises:

an intermittent reception information memory means for recording the contents of intermittent standby information containing said intermittent standby superframe interval.

8. A digital wireless telephone system comprising a mobile station provided with a reception portion, which portion is timed in its turning-on-power operation to a paging channel contained in a sending signal issued from a telephone exchange to said mobile station through a base station, and is held in its de-energized state in the remaining period of time, wherein said telephone exchange retrieves location information and subscriber's information from a subscriber's information memory, and continuously sends out an inter-superframe paging message in a paging channel group, for which groups said mobile station is waiting, the number of said inter-superframe paging messages being the same value as that of intermittent standby superframe intervals; and wherein said mobile station receives broadcast information, and performs its intermittent standby reception operation, on the basis of said intermittent standby superframe interval contained in said broadcast information; and wherein said intermittent standby reception operation reduces power consumption of said mobile station by arbitrarily controlling the interval of intermittent standby reception.

9. The digital wireless telephone system as set forth in claim 8, wherein:

said telephone exchange comprises:

a Pi information setting means for setting said intermittent standby superframe interval information element in an extension information element contained in said broadcast information;

a PCH group analyzing means for analyzing said paging channel group, for which group said mobile station is waiting, on the basis of said location information and said subscriber's information both retrieved from a subscriber's information memory; and a message continuously sending out means for continuously sending out an inter-superframe paging message in a paging channel group, for which group said mobile station is waiting, the number of said inter-superframe paging messages being the same value as that of said intermittent standby superframe intervals.

10. The digital wireless telephone system as set forth in claim 1, wherein:

in an intermittent reception state, said mobile station measures a perch channel in a peripheral zone after completion of reception of said paging channel in timing, the number of said peripheral zones to be measured being the same value as that of said intermittent standby superframe intervals.

11. The digital wireless telephone system as set forth in claim 1, wherein:

in an intermittent reception state, said mobile station measures a perch channel in a peripheral zone each time a superframe appears.

12. The digital wireless telephone system as set forth in claim 1, said mobile station comprising:

analyzing means for analyzing the intermittent standby information contained in said broadcast information;

measuring means for measuring a bit error rate and a reception level; and control means for control of said mobile station that performs high efficiency intermittent reception in case said control means recognizes the presence of the intermittent standby information and that a prescribed value of said bit error rate and of said reception level each exist.

13. The digital wireless telephone system as set forth in claim 1 said mobile station comprising:

analyzing means for analyzing the intermittent standby information contained in the broadcast information;

measuring means for measuring a bit error rate and a reception level; and control means for control of said mobile station that stops high efficiency intermittent reception and performs ordinary reception in case said mobile station recognizes the intermittent standby information does not exist, or either of the bit error rate or the reception level have an inappropriate value.

* * * * *